July 9, 1935. H. M. FRIENDLY 2,007,711
ELEVATOR TIMING INDICATOR
Filed Feb. 23, 1929 3 Sheets-Sheet 1
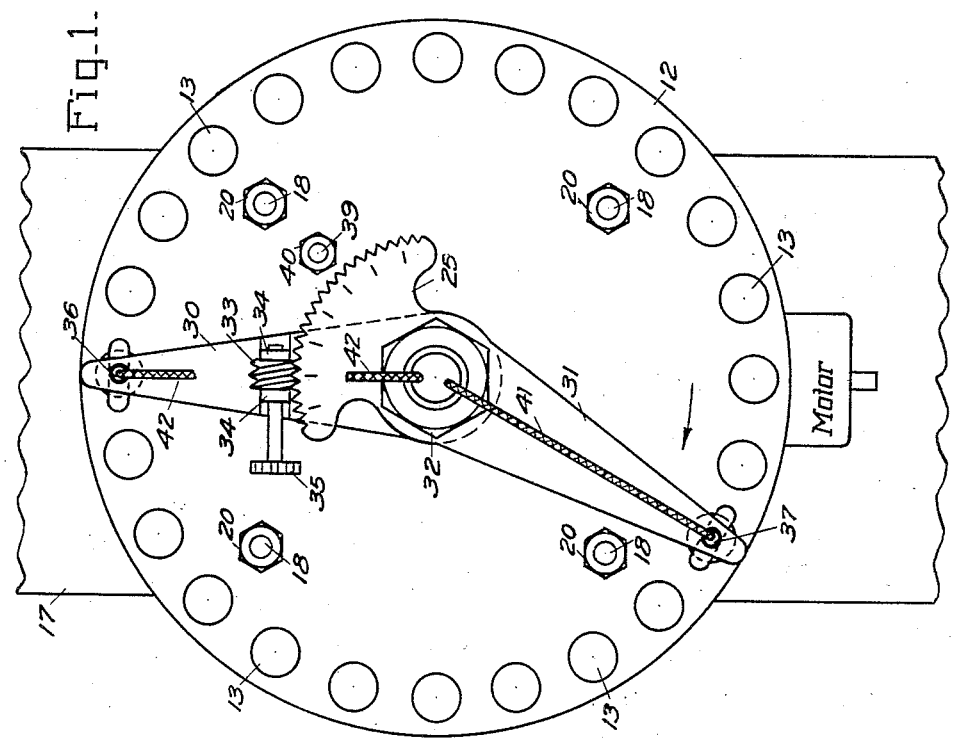
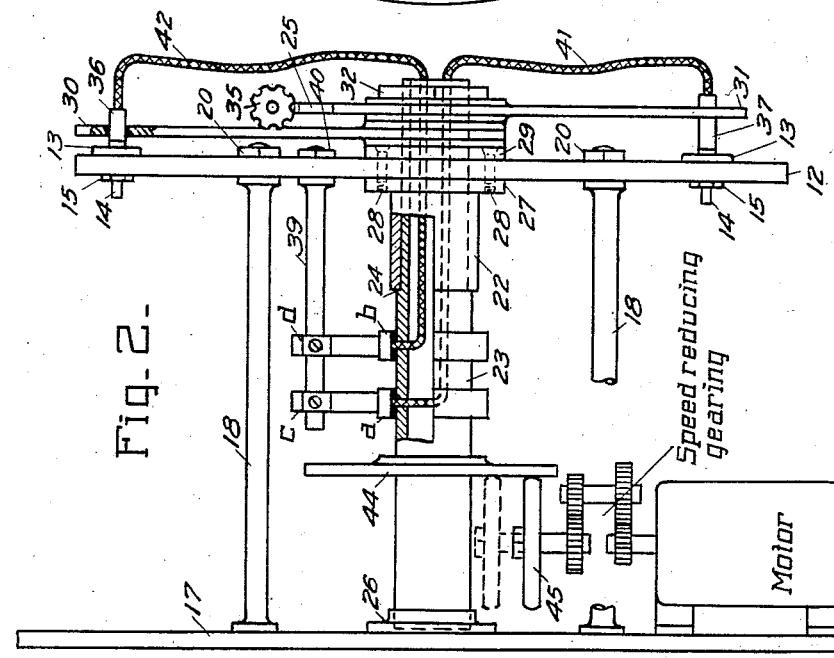
Inventor-
Herbert M Friendly
George E. Mueller Atty.

July 9, 1935.  H. M. FRIENDLY  2,007,711
ELEVATOR TIMING INDICATOR
Filed Feb. 23, 1929   3 Sheets-Sheet 2
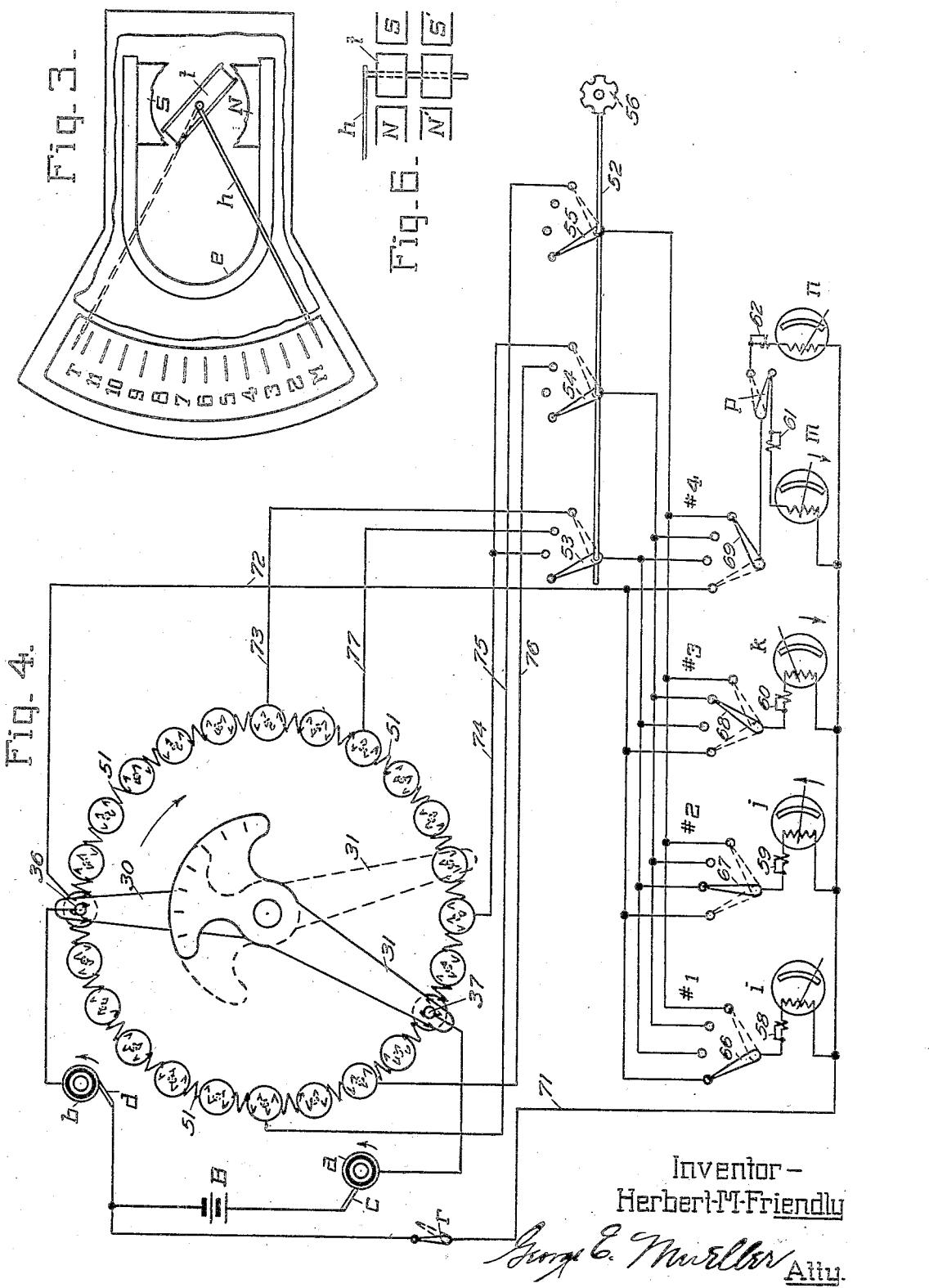
Inventor—
Herbert M. Friendly
George E. Mueller Atty.

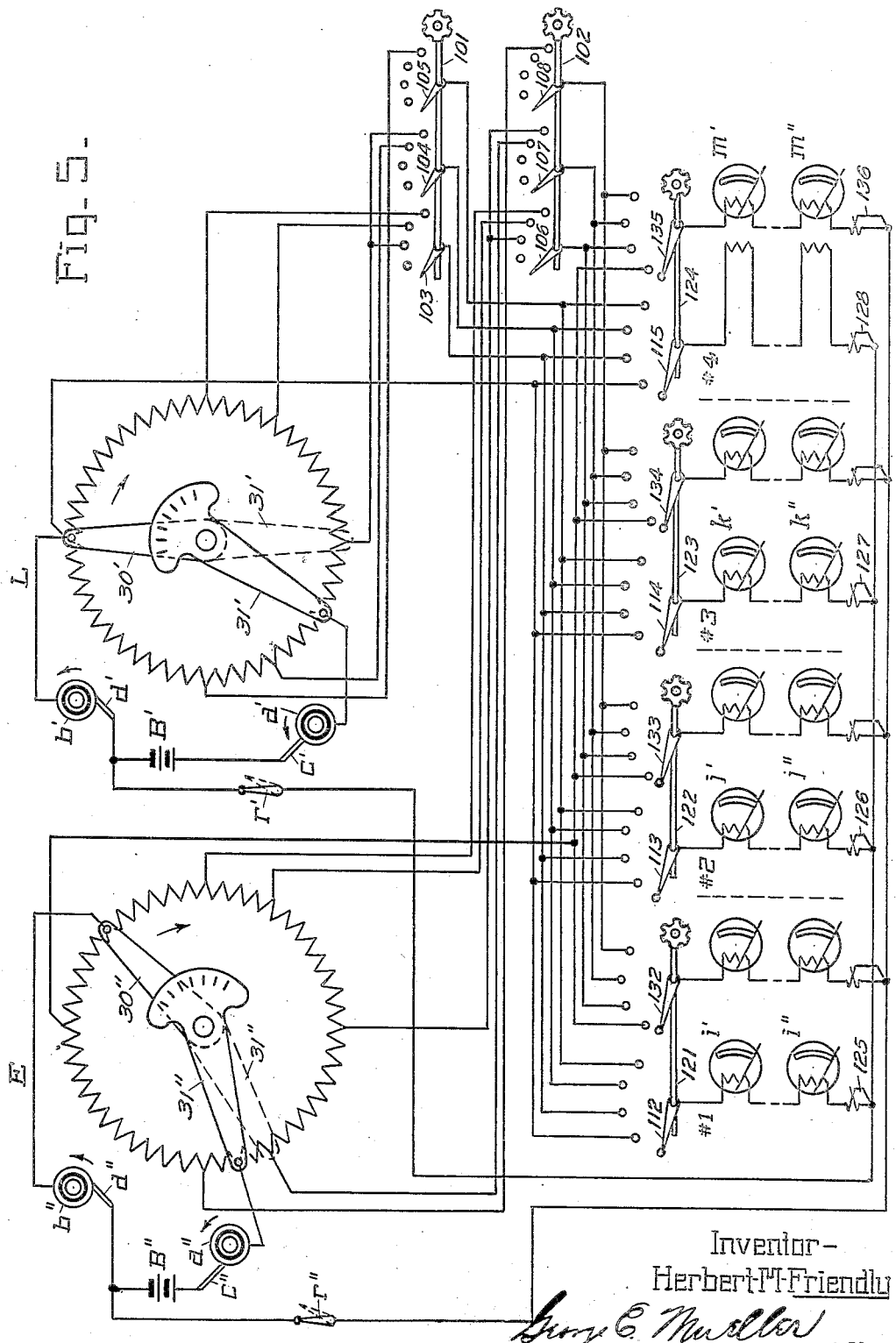

Patented July 9, 1935

2,007,711

UNITED STATES PATENT OFFICE 2,007,711

ELEVATOR TIMING INDICATOR

Herbert M. Friendly, Chicago, Ill.; Milton S. Friendly and Central Republic Trust Company, executors of last will of said Herbert M. Friendly, deceased, assignors to Milton S. Friendly, Chicago, Ill., Oscar N. Friendly, Salt Lake City, Utah, and Central Republic Trust Company, Chicago, Ill., a corporation of Illinois, trustees, under the will of Herbert M. Friendly, deceased Application February 23, 1929, Serial No. 342,210

8 Claims. (Cl. 177—336)

The object of the present invention is to provide means through the agency of a time controlled indicator in each car of a bank of elevator cars whereby the respective indicators will indicate the travel position that the car containing it should occupy from time to time, having in mind that the cars of the bank will be deployed in such manner as will promote uniform periodic departing of cars from the main or starting floor and so that the operators of the respective cars will, by observing the indicator of his car and noting the actual travel location of his car, know if he is on schedule or how much his car is ahead or behind the predetermined schedule.

The indicator of the exampled form of the present invention comprises an electrically controlled instrument sensitive to change in voltage applied to it, and is therefore essentially a volt meter with its scale divisions marked in floor divisions in place of voltage values. This indicator will then continuously move its pointer over its scale indicative of the travel position the corresponding car should occupy. The indicators in the various cars will, of course, indicate differently at any specific time, so that the cars will be deployed uniformly if in the travel positions indicated by the respective indicators. However, it is not necessary that there shall be uniform deployment as expressed by the indicators, as will appear presently.

Another object is to provide an indicator controlling mechanism for operating said indicators which may be located convenient to the party in charge, so arranged that it may be readily changed from time to time in its setting to adapt the operation of the various car indicators to the number of cars in the bank which are in operation, having in mind that there may be a different number of cars in operation from time to time during the day.

Another object is to provide means whereby the relative up and down travel time may be changed, having in mind that when occupants are entering the building in the morning there will be relatively large up traffic, and when they are leaving for lunch or in the evening there will be relatively large down traffic. This is assuming the installation to be in a commercial office building. The time allowed for up and down travel of the cars may be varied from time to time without necessarily varying the total time for a complete cycle or trip for the car, although the total time for a cycle or trip may also be varied independent of the time for up and down travel thereof.

Another object is to provide an indicator which will move its indicating pointer at a faster rate over the travel distances indicated which are to be made at a faster rate by the cars where there are cars operated "express" to and from certain floors. That is, in a twelve-floor building, as assumed in the exampled system, certain cars may leave or approach the main or lowermost floor and not stop to take on or let off passengers between the main floor and the eighth floor, for example, and therefore will travel this distance faster than corresponding distances between the eighth floor and the twelfth floor. Under this arrangement, the pointer of the indicator will simulate the rate of travel the car is supposed to make, the pointer moving at a faster rate per unit of car travel distance between the main floor and the eighth floor than between the eighth floor and the twelfth or topmost floor.

Another object is to provide means whereby certain of the elevators of a bank may be operated in the manner referred to in the last foregoing paragraph, while other cars of the bank are operated on a uniform schedule between the main floor and the topmost floor, having in mind that the speed of travel contemplated for up and down traffic may differ from each other. This provision enables any cars of the bank to be run express or local, as desired and then any car may be made the "pilot" or leading car for both the local and express groups, respectively.

Another object is to provide for the starter or supervisor a counterpart indicator for each of the car indicators so that he will be able to know at all times what indication is being shown in each car at a central point.

Another object is to provide means whereby the respective indicators of the cars as well as the counterpart indicators thereof may be readily adjusted, by means of a rheostat, to compensate for varying operating voltage of the indicator system.

Another object is the provision of two operating mechanisms; one for locally operating cars and the other for express operating cars, and wherein the indicators of the respective cars can at will be connected to operate from either said mechanism.

With reference to the accompanying three sheets of drawings:—

Fig. 1 shows the front elevation view of the mechanism for operating the car indicators.

Fig. 2 shows a side elevation view of the mechanism shown in Fig. 1.

Fig. 3 shows a front elevation view of the indicator as used in the respective cars and for the elevator starter or supervisor.

Fig. 4 shows the wiring diagram of the system, in one of its embodiments.

Fig. 5 shows the wiring diagram of the system in its preferred or more comprehensive embodiment.

Fig. 6 shows the manner of combining the two types of indicators indicated as $m$ and $n$ in Fig. 4.

With reference to Figs. 1 and 2, the circular mounting member 12 is of insulating material and has twenty-four contact studs 13, each having a tapered terminal shank 14 threaded at the base of the shank and which shank extends through the mounting member 12 and secured by the nut 15. These contact studs 13 are angularly spaced fifteen degrees and are set near the circumference of the member 12 and equidistant from the center of the member 12.

The mounting member 12 is supported from the wall or upright 17 by four spacing and support bolts 18.

A sleeve 22 is fitted into the center of the mounting member 12 and a hollow shaft 23 fits revolvably into the sleeve 22 wherein the shoulder 24 on shaft 23 prevents the shaft from moving to the right. The left-hand end of the shaft 23 revolves in the wall bracket bearing 26. The ring 27 fits over the sleeve 22. Three screw-bolts 28, two of which are shown dotted in Fig. 2 screw into threaded holes in the ring 27, passing through holes in the flange 29 on sleeve 22 and the mounting member 12, serving to hold the sleeve 22 rigid with the member 12.

The brush-holding arm 30 is fastened rigidly to the shaft 23, so that it revolves with the said shaft and takes the end thrust of the shaft towards the left. The brush-holding arm 31 fits revolvably over the end of the shaft 23. A nut 32 screws against the shoulder, not shown, of the shaft 23 and against the face of the brush-holding arm 31, so that the latter said arm may turn with the shaft 23 between the brush-holding arm 30 and the nut 32. However, the turning movement of the brush-holding arm 31 is restrained by the worm-screw 33 held between the brackets 34. The hand-screw wheel 35 is for turning the worm-screw 33. The brush-holding arm 31 may thus be revolved through a limited angle determined by the segment 25 on the brush-holding arm 31 having the gear teeth co-operative with the worm 33, for an object, as will appear presently.

The brush-holding arms 30 and 31 are made of metal and carry the conducting brushes 36 and 37, respectively, which contact with the studs 13, are insulated from the said arms.

The rings $a$ and $b$ are mounted concentric with and are insulated from the shaft 23. Cooperative with these rings $a$ and $b$ are the brushes $c$ and $d$, respectively, which are carried by the brush support arm 39 and insulated from the latter said arm. The brush support arm 39 is secured to the member 12 through which it passes, by nut 40. The brushes $c$ and $d$ therefore make continuous electrical contact with the ring $a$ and $b$, respectively, at all times when the shaft is moving as well as when it is at rest.

Flexible insulated conductors 41 and 42 leading out through the hollow of the shaft 23 connect the rings $a$ and $b$ to the contact conducing brushes 37 and 36, respectively. These brushes 36 and 37 are so designed as to contact the next stud before leaving a stud.

The shaft 23 rigidly carries the friction disc 44. A motor, so designated, has its revolving shaft connected through the designated speed reduction gearing to the friction drive wheel 45 cooperative with the disc 44. It is thus clear that the speed of revolution of the shaft 23 can be varied by either changing the speed of the motor by any well known or other means, such for example, as by introducing resistance in the energizing path of the motor. The speed of the shaft 23 may also be varied by moving the friction wheel 45 toward the shaft 23 to reduce the speed of the shaft 23, and away from the shaft toward the periphery of the friction disc to increase the speed of the shaft 23. Moreover, the speed of the motor may be varied and also the adjustment of the friction wheel made in attaining the desired speed for the shaft 23 and the arms 30 and 31 carried thereby.

From the foregoing, it will be clear that the brushes 36 and 37 revolve clockwise in successive contact with the twenty-four contact studs 13 continuously while the motor is running, and the speed of this revolution may be governed by the speed of the motor, which may be varied by any desired means, or by adjusting the position of the friction-wheel 45 by any desired means, as for example, by moving the motor carrying same endwise. The arms 30 and 31 will revolve one complete revolution or make one cycle during the time it is desired to have an elevator car timed thereby make a complete cycle; that is, for example, starting from the main floor and returning to the main floor and there awaiting until time to start the successive cycle. This time will be varied in accordance with the traffic and the distance of travel of the cars. Moreover, the direction of heaviest traffic will also be determining to a degree. Of course, the number of stops on the up and down travel of the respective cars will be a factor in assigning the most expedient speed. Under certain conditions of traffic, it may be desirable to have the arms 30 and 31 make one cycle every two minutes, and this traffic and attendant desirable rate of rotation of the arms 30 and 31 will usually vary from time to time during the day.

It is noted that only the contact studs 13 upon which the brushes 36 and 37 are shown resting in Fig. 1 are shown in Fig. 2, in order to avoid involving the drawings more than necessary to comprehensively disclose the structure and operation thereof and to insure not obscuring or confusing other structural elements.

Further, connected between the terminal shanks 14 are twenty-four resistors 51 shown in Fig. 4, but not shown in Figs. 1 and 2. It is to be noted that an endless circuit path through the twenty-four resistors is thus formed, and this circuit path is tapped at twenty-four equally resistant points of said circuit path onto the twenty-four contact studs 13.

The brushes 36 and 37 are so designed that as the arms 30 and 31 revolve contact will be made by the respective brushes 36 and 37 with a succeeding stud 13 before disengaging a stud, so as to avoid opening the current supply (to be described presently) coursing the endless circular resistor made up of the twenty-four resistors 51. Obviously, in place of making the brush with a dimension so as to bridge adjacent studs 13, the said studs 13 may be made larger in diameter so as to be closer together, or they may be increased in number or spaced with a smaller radius from the center of the mounting member 12. Moreover, in place of using the contact studs 13 at twenty-four points in the resistor made from the component resistors 51, a continuous wire coil or spiral resistor may be employed and secured to the front face of the member 12. The brushes 36 and 37, made very narrow, will then insure that only a narrow point of contact will result with the wire of the resistor. Resistors made up of a continuous wire coil are not new as a general class, having in mind that the present embodiment shows an endless resistor of specific type, which is believed to be novel. The endless wire spiral resistor cooperated directly with the brushes is the preferred embodiment, as this insures more gradual change in the resistance and is cheaper to manufacture. Made of stout wire and of proper cross section of coil will give considerable wear, and when worn out may be readily displaced by a new resistor element. The said spiral resistor may be made in a unit having a triangular cross section of spiral and truncated at the apex by a short radius curve where the brushes engage it. The resistor may be embedded into the base of a backing adapted to mount as a unit on the member 12. The said unit may also carry the terminals for the circuit taps. This arrangement is indicated in Fig. 5. Moreover, the Fig. 5 shows the wiring diagram of the preferred embodiment, using an endless spiral resistor for each of the two controllers E and L. These controllers E and L may be alike in mechanical detail and so arranged that one may be driven at a different speed from the other.

Referring now to the indicator shown in Fig. 3, this is the well known form of voltmeter, modified in accordance with the present invention. One of the novel features of the said indicator is the shape of the magnet pole-pieces designated N and S, respectively. At and near the normal or zero position of the coil of the indicator, and also at and near the position of the coil when the needle is at full throw there is a slightly larger clearance between the coil and the pole-pieces to make the deflection of the needle less per unit of current change than at other positions. Also, for the arc over which the coil moves, indicating no stops in express service, there is less clearance than in the arc over which the coil moves indicating stops or local service. That is, the indicator shown in Fig. 3 is the indicator as used in cars run express, or used when a car is run express. It will thus be clear, that with a uniformly changing current from zero to maximum and back to zero, the pointer will move very slowly at the extremes of movement and at a different rate over the intermediate portions. That is, the indicator pointer will simulate the movement of a car that will make an express run to a predetermined floor and make stops thereafter going up and coming down to the express division, from whence it will proceed to the main floor without making stops.

For the cars that only run local and make stops at all floors, the intermediate change in rate of movement of the indicator pointer will not be desired, and the clearance between the pole-pieces and the coil will then be uniform intermediate of the ends.

The indicator in Fig. 4 designated $m$ is for local running, while the indicator designated $n$ is for express running, the switch $p$ being used to change from one indicator to another. This switch $p$ may be mounted in the car or it may be mounted on the main floor contiguous to the operating mechanism and attended by the starter or supervisor. The indicators $m$ and $n$ are in the #4 car. The cars #1, #2 and #3 are shown having single indicators of the local type referred to.

In this connection, it is stated that the preferred type of indicator for the cars that may be run express part of the time and local part of the time embody two characteristic movements with a single pointer. One movement is placed above the other on the same revolving spindle and using a single pointer common to the two movements. This is indicated in Fig. 6 wherein the movement having the pole-pieces N—S indicates the type for the express service, and the movement having the pole-pieces N'—S' indicates the type for the local service. The combined indicator may be termed a "duplex" indicator, since it combines the different movements in one indicator having a pointer common to both movements. A switch as $p$ is employed to switch from one coil to the other, the duplex indicator being essentially two independent indicators so far as the electrical circuits are concerned.

In this connection, it will be pointed out, that the resistance of the electrical circuit of the indicators will be high, so that they will not derive enough current from the resistor to appreciably affect the fall in voltage in the resistor, which might affect the readings made by interlinked indicators. That is, the strength of current coursing the resistor made up of the resistors 51 will not be appreciably affected by the current derived by the various indicators because the resistor will be of relatively low resistance and carry current of sufficient strength to not be appreciably varied by the drain of current therefrom by the indicators.

The rheostats 58 to 62, inclusive, drawn adjacent to the indicators $i$ to $n$ are rheostats in series with the movable coil winding of the respectively adjacent indicator winding and is used in adjusting the total resistance of the corresponding indicator in the event the supply voltage varies from time to time. The operator of a car, upon noting that the pointer of his indicator is traveling past or is not traveling to the proper up point of the indicator scale would introduce more resistance or cut out resistance of the corresponding rheostat to make the throw of the pointer that desired.

In this connection, it is noted that the twelve radial graduations on the scale of the indicator Fig. 3 start with "M" (denoting the first or main floor) and has the uppermost graduation designated "T" (denoting the top or uppermost floor). It is particularly noted that the zero position of the pointer $h$ is some distance below the "M" graduation, and that the "T" graduation is a lesser distance than the latter below the dotted position of the pointer indicative of its extreme operated position. It is stated that this is so that the time elapsing from the instant the pointer in moving up coincides with the "T" graduation until it moves to its extreme up position and then returns to the said "T" graduation on its downward movement represents the time the car will remain at the top floor, or may be taken as the extra time for the trip up in the event there has been a delay. Then, the time elapsing from the instant the pointer is moving down coincides with the "M" graduation until it moves to the extreme down or zero position and returns to the said "M" graduation on its upward movement represents the time the car will remain at the main floor or may be taken as the extra time for the trip in the event there has been a delay.

In this connection, it will be remembered that the movement of the pointer $h$ over the space above the graduation "T" and below the graduation "M" will be at a slower rate than at other parts or portions of the scale, due to the notching of the pole pieces at their tips, or at the points thereof that influence the coil at the extreme positions.

The operator of the car has only to observe the pointer of the indicator to determine where he should be in the travel up and down or should be resting at the top floor or the main floor, since the pointer is continuously moving back and forth over the scale of the indicator to indicate the position the corresponding car should occupy at the instant of observation.

It will appear that if there are four cars operating in the bank as indicated in Fig. 4 the movements of the corresponding four indicators (having in mind that indicators $m$ and $n$ are in the same car #4) will be ninety degrees of a cycle apart. In the same manner, if only three of these cars are operating their corresponding indicators will be one-hundred-twenty degrees apart. It will also appear presently that any car of the bank may be made the pilot car or be given any desired order in the successive operations of the cars of the bank, regardless of the number of cars operating in the bank.

It will also appear that the starter or other party in charge of the bank of cars can from a central point at which operating mechanism is located, for example, operate switches to not only space the various cars, but also set the mechanism to govern the relative time for up and down operation of the cars.

While the drawings Fig. 4 show a single car indicator of a particular type corresponding to each car, it will be understood that a second indicator may be connected in series with respect to each of the car indicators so that the starter will have before him a corresponding indication of each car indicator. In the event that the starter's indicators are in series with the respective car indicators, but one rheostat as 59 to 62 will be required for corresponding pairs of indicators, and this rheostat may then be convenient to the starter who will be enabled to coincidently adjust the corresponding two series connected indicators from his station.

The elements of the system of the present invention general embodiment having been described, the more detailed operation of the system will now be taken up, and reference is accordingly made to Fig. 4 which discloses the circuits of a simple embodiment of the invention, having in mind that the preferred, comprehensive embodiment is disclosed in the circuits shown in Fig. 5.

The stem 52 has three switch-arms 53, 54 and 55 rigidly attached thereto. Thus, through the agency of operating wheel 56 on the stem 52, the switch-arms 53 to 55 can be coincidently operated with relation to the indicated cooperative contact terminals. In the drawn positions of the switch-arms 53 to 55, the system is out of commission. When the latter said switch-arms are each in the next to last position, counting from the left, there will be three of the four cars of the bank in service, and with the said switch-arms in the last (dotted) positions on the right, all four cars will be in commission. Thus, it is seen that the starter or person in charge will adjust the switch-arms 53 to 55 in accordance with the number of cars of the bank there are in operation. The starter will next set the switch-arms 66 to 69 in accordance with the order in which the respective cars are to depart from the main floor or starting point. Thus, with the switch-arms 53 to 55 in the dotted positions, and the switch-arms 66 to 69 in the drawn positions, there will be all four cars in commission and the said cars will depart in numerical order, counting from the left. That is, the numerical position of the switch-arms 66 to 69 will determine the order of operation of the cars. No two of the switch-arms 66 to 69 would ordinarily be on corresponding positions with respect to their cooperating contact terminals. The switch-arm $p$, as before referred to, and indicated in Fig. 4, serves to change from one indicator to another, or from one to the other coil of the duplex indicator which has been stated is like two indicators, with the exception that the movable coils are mounted on the same spindle, so that either coil will be able to move the common spindle and pointer thereon.

Having in mind that the arms 30 and 31 revolve, it will be clear that the voltage derived from the battery source B, or other suitable source of current, will be constantly applied to two different points in the circumference of the resistor circle, and that these points will bear a constant angular relation to each other. That is, the negative potential from source B will move clockwise around the resistor circle, while positive potential from said source B will be moved at a constant angular distance from the point of application of the negative potential.

The shaft 23 driving the arms 30 and 31 will move through 210 degrees in changing the potential of the point the brush 37 is shown resting upon to the full negative potential carried by brush 36, while the said shaft will have revolved through only 150 degrees in changing the potential of the point the brush 36 is shown resting upon to the full positive potential carried by brush 37.

It is noted that the conductor 71 to which the lower terminal of the winding of indicator $i$ is attached is constantly at negative potential, and in the position occupied by the arm 30 in the drawings the upper terminal of the winding of the indicator $i$ has the full negative potential applied over conductor 72, so that the pointer of the indicator $i$ is at its zero position. When the arms 30 and 31 move through 150 degrees the brush 37 will be applying the full positive potential over the conductor 72 to move the pointer of the indicator $i$ to the extreme operated position. However, the wipers 30 and 31 will now have to move through 210 degrees to restore the full negative potential over conductor 72 to the upper terminal of the winding of the indicator $i$, at which time the pointer $h$ thereof will have returned to the zero position. That is to say, the shaft 23 turned through 150 degrees to move the pointer of the indicator $i$ over its entire range from the zero position, and that the shaft 23 turned through 210 degrees to move the pointer from the latter said position back to zero position. Under this setting of the arms 30 and 31 the time allotted for the up travel of the car as compared to the time allotted for the down travel of the car is in the ratio of 150:210.

If it is assumed that the arm 31 is moved into the dotted position shown in Fig. 4, the ratio above referred to would change to 195:165.

If it is assumed that the arm 31 is moved so that it is disposed diametrically with the arm 30, the ratio above referred to would be changed to 180:180, or that there will be equal time for up travel and down travel.

It will be understood that the changes need not necessarily be in steps of 15 degrees, but may be made in any desired step by operating the adjustment wheel 35 shown in Fig. 1.

By reference to Fig. 4, in view of what has been explained, it will be perceived that when the four cars are in operation the upper winding terminals of the indicators *i* to *m* are connected at 90 degree intervals, starting with the contact stud 13 upon which the brush 36 is shown resting, and that therefore as the arms 30 and 31 revolve, each said indicator will similarly operate one time for each complete revolution of the arms 30 and 31, wherein there will be a fourth of a cycle or 90 degrees difference in the operated state of the respective indicators, counting from left to right. That is, the operated state of indicator *k* will be one-fourth of a cycle behind the indicator *j*, for example.

Assuming that the arms 53 to 55 are now changed from the dotted positions, counter-clockwise one position, indicative that there are only three cars now in operation, and that the arms 66 to 69 are left as last used (as drawn), it being further assumed that it is still desired to have the three cars having the indicators *i* to *k* in use and to operate the same in the order as before, the following will ensue. It will be noted that the conductor 75 will not now be used. The conductors 76 and 77 not before used will be used and the conductors 73, 74 and 75 will not be used. It is further noted that the conductors 72, 77 and 76 are now connected to the upper winding terminal of the indicators *i*, *j* and *k*, respectively, and that these conductors tap the endless resistor at points 120 degrees apart. In the same manner, if the arms 64 to 66 are now further changed counter-clockwise one position, indicative that there are only two cars in operation, the arms 66 to 69 may be left as last used, if it is desired to have the two cars having the indicators *i* and *j* in use and to operate in the same order as before. It will be noted that conductors 73, 77, 76 and 75 will not be used. Only conductors 72 and 74 will be concerned, the conductor 72 as before being connected to the upper winding terminal of indicator *i*, while the conductor 74 will be connected to the upper winding terminal of indicator *j*, so that the indicators *i* and *j* will operate half a cycle apart.

It is noted, in this connection, that the angular operating period or the phase, as it may be conveniently termed, existing between the corresponding operated states of the various indicators, is independent of the relative time taken for each indicator to complete a half cycle of its operation, the latter being governed by the position of arm 31 with respect to arm 30, and which may be adjusted from time to time by the party in charge of the system, depending upon traffic characteristics.

*Preferred embodiment*

With reference to Fig. 5, the indicator operating mechanisms E and L, are for operating the indicators in a bank of elevator cars wherein some are to be run local and some are to be run express, and wherein a different time for a complete trip is to be allowed for the cars run local from the cars run express. Moreover, each of the cars may be run local or express, as desired.

The same method of operation of the indicators is employed in Fig. 5 as disclosed in Fig. 4. However, the Fig. 5, in fact, is comprised of two mechanisms and cooperative circuits as shown in Fig. 4, but wherein the resistor of the respective mechanisms E and L comprise an endless toroidal winding. In nearly all large elevator installations in office buildings, certain of the cars are run express and certain of them are run local during the day, so that the Fig. 5 embodiment is adapted to direct each car in accordance with the class of service it renders.

It will be noted, in respect to Fig. 5, that there are stems 101 and 102 each corresponding to the stem 52 in Fig. 4, and that each of these carry three switch-arms 103 to 105 and 106 to 108, respectively.

The mechanism L and its associated circuits is to be assumed as like the mechanism and associated circuits in Fig. 4. The only difference is that starter's checking or counterpart indicators *i''*, *j''*, *k''* and *m''* are shown in series with the car indicators *i'*, *j'*, *k'* and *m'* in Fig. 5, in place of single indicators *i*, *j*, *k* and *m* in Fig. 4. The switch-arms 112 to 115 correspond to switch-arms 66 to 69, respectively, in Fig. 4. The indicators *i'*, *j'*, *k'* and *m'* correspond to indicators *i*, *j*, *k* and *m* in Fig. 4, having in mind that indicator *m'* is a so-termed duplex indicator, as will appear presently.

It will be understood, in this connection, that turning spindle 101 and switch-arms 112 to 115, will have the same effect as turning spindle 52 and switch-arms 66 to 69, respectively. The operation and purpose of the spindle 52 and the switch-arms 66 to 69 having been fully set forth, it will be understood that indicators *i'*, *j'*, *k'* and *m'* may all be operated from the corresponding specific mechanism L and the mechanism E left out of commission.

The rings *a'* and *b'* in Fig. 5 correspond to rings *a* and *b* in Fig. 4. The brushes *c'* and *d'* in Fig. 5 correspond to brushes *c* and *d* in Fig. 4.

The indicators *i'*, *j'* and *k'* are like indicators *i*, *j* and *k*. The indicators *i''*, *j''* and *k''* are like indicators *i'*, *j'* and *k'*, and the indicator *m''* is like the indicator *m'*, and have their respective windings connected in series. The rheostats 125 to 128 are connected in series with the windings of the indicators *i'*—*i''*, *j'*—*j''*, *k'*—*k''* and *m'*—*m''*. These correspond to mechanism L, the rheostats for adjusting the maximum throw of the pointers of the respective indicators in accordance with the voltage of the battery B'.

In view of previous descriptions with respect to Fig. 4, it will not be necessary in imparting a comprehensive understanding of the operation of the mechanism L in operating the indicators *i'* to *k'* and *m'* and *i''* to *k''* and *m''* and the setting of the switch-arms 103 to 105 and 112 to 115 in changing the set-up depending upon the number of cars in commission and the order of running the cars in commission, to specifically detail the setting and other obvious operations in view of the statements and the manner of illustrating the arrangements.

It will be noted that the mechanism E has its brush-carrying arms 30'' and 31'' drawn in different position than shown for arms 30' and 31' in the mechanism L. However, the operation is the same. The rings *a''* and *b''* correspond to rings *a'* and *b'*, and brushes *c''* and *d''* correspond to brushes *c'* and *d'*. The battery source B'' corresponds to battery source B', in fact these may be the same source, in practice.

The switch-arms 132 to 135 have the same relation to mechanism E as the switch-arms 112 to 115 have to mechanism L.

The indicators shown on the immediate right of the respective local indicators $i'$ to $k'$ and $i''$ to $k''$ are express indicators made like the local indicators $i'$ to $k'$ and $i''$ to $k''$, with the exception that the express indicators have pole-pieces which have varying clearance as shown in Fig. 3, while the pole-pieces of the local indicators have a uniform clearance so that the pointers thereof will move uniformly with a specific current change between the points M and T of the indicator scale.

So that it is obvious how the indicator of each car can be at will connected to operate from either mechanism L or E and in any desired order of cyclic operation with respect to other indicators operated by the mechanisms L and E.

It is particularly pointed out, however, that the switch-arms 112—132, 113—133, 114—134, 115—135, are so set upon the spindles 121 to 124, respectively, that they engage their cooperating contact terminals alternatively. That is, for example, when swich-arm 112 is engaging a contact terminal the switch-arm 132 will not be, and vice versa. Thus, it is impossible to cooperate the indicators of the respective cars with more than one of the mechanisms L or E at any one time.

The supervisor, by operating the switch-arms on one of the stems 121 to 123 determines which indicator, local or express, will be employed to direct the respective car. The supervisor, by operating the switch-arms on spindles 101 or 102 determines the number of cars that are to be in commission in the local and express service, respectively, and the attendant equal deployment of the cars of the respective services.

The car #4 indicated on the right has a single duplex indicator with two energizing moving coils effective to it, disposed as indicated in Fig. 6. There is a rheostat 128 for adjusting the pointers of the indicators $m'$ and $m''$ when operated in local service by the mechanism L, and a rheostat 136 for adjusting the pointers of the indicators $m'$ and $m''$ when operated in express service by the mechanism E.

It will, of course, be understood that the stems 101, 102, 121 to 124 and 52 are insulated from the switch-arms carried thereby.

It will be seen that I have produced an electrical system that will convert a direct current into a polyphase current, the number of phases derived varying depending upon manually set switches. Moreover, that the said currents derived are unidirectional; that is, vary from zero to a maximum and back to zero to constitute a cycle. Each of the phases will be angularly spaced at an angle represented by 360 degrees divided by the number of phases.

In this connection, it will be noted that in case it is desired to convert the direct current into a polyphase current alternating in character, the switch $r$ in Fig. 4 (or corresponding switches $r'$ and $r''$ in Fig. 5) will be opened. That is, the currents in the phases will rise from zero to a maximum and back to zero in one direction for a rise and fall, and then rise to a maximum and back to zero in the opposite direction.

It will be noted that a complete revolution of the shaft 23 will measure one cycle, whether the polyphase currents are unidirectional or alternating in character.

It will be noted that the rise and fall of current value of the various phases are independent of the other said phases, and consequently only a single phase may be taken from the endless resistor and obtain current that will rise from zero to maximum and back to zero while the shaft 23 is making a single revolution, this tap being taken at any point on the resistor as a starting point. Moreover, by opening the switch $r$, the single phase tap will then carry a complete cycle of alternating current for each revolution of the shaft 23.

It will be further noted, in connection with the last foregoing statements that by varying the resistance per unit length of the arc of the resistor, that the rate of change in the current strength will be accordingly changed.

It will appear from the latter statements that by providing a mechanism as indicated in Fig. 4 for each elevator car, and having the arms of a plurality of such mechanisms rigidly set at angular distances with correspondence to the number of cars in operation, the indicators will operate with a predetermined phase difference in the manner described with reference to Fig. 4. That is, a single endless resistor may be tapped to operate a plurality of indicators as shown in Fig. 3, or it may operate a single such indicator, there being a said resistor specific for each indicator. For example, the endless resistor made up of resistors 51 in Fig. 4 may be tapped only by conductor 72, and with the switch-arm 66 in the drawn position, the indicator $i$ will be the only indicator operated. If there are a plurality of cars operated, each would have its individual mechanism as shown in Figs. 1 and 2, with the mechanisms mechanically interlinked and timed with respect to each other, so that there will be the desired phase difference in the operation of the various indicators.

In connection with the last foregoing statements, it will be clear that the toroidal winding of the resistor of the mechanisms as E and L when used to operate a single indicator may have a predetermined varied resistance per unit of circumference, so that the indicator operated thereby will move its pointer with correspondence with the relative value of the resistance per unit angle of movement of the shaft carrying the brushes cooperative with the resistor. This method of varying the rate of movement of the pointer of the indicator while the brushes revolve at uniform rate obviates the special construction of the pole-pieces of the indicator wherein the clearance between the coil and pole-pieces vary corresponding to predetermined angular distances of the pointer range.

While the exemplary embodiment of the invention is that of an elevator timing indicator system, it is to be understood that the invention may be employed and adapted for other uses, and that it may be modified in mechanical and electrical details without departing from the invention defined by the broadest aspect of the claims.

I claim:—

1. In a car and dispatching system, a plurality of cars operating up and down through common travel divisions, an indicator for each car comprising a scale calibrated to correspond to the travel path of the car and an indicating pointer for showing the scheduled position for the corresponding car, automatic timing mechanism common to said indicators for operating the pointers over the scales of the said indicators so that the indicator for each car will at all times indicate the travel location its car should occupy while maintaining constant deployment between the cars, and means in said indicators for causing the indicators to direct the cars in such manner that the rate of travel in the same direction may be varied while maintaining the constant deployment.

2. In an electric indicator system, a single endless resistor element, a source of constant electrical potential, a pair of brushes connected to different potential terminals of said source, movable arms adjustable with respect to one another carrying said brushes at predetermined distance apart in continuous movable conductive contact with said resistor, a plurality of electrically operated indicators, a circuit for energizing each of said indicators extended from a common point and including the operating conductor of a said indicator to a respective tap point on said resistor, the respective tap points of said operating conductors being spaced at predetermined distance apart with respect to the total resistance of the resistor, whereby as the arms move said brushes along the resistor polyphase varying currents derived from said source will be applied over said conductors to operate said indicators wherein the indication of the respective indicators will differ from each other by a phase difference that is a factor of the location of the corresponding tap points on the resistor.

3. In an electrical indicator system, an endless resistor element, a source of constant electrical potential, a pair of brushes connected to different potential terminals of said source, movable arms adjustable with respect to one another carrying said brushes at predetermined distance apart in continuous movable conductive contact with said resistor, a plurality of electrically operated indicators, a separate circuit for energizing each said indicator extended from a common point and including the operating conductor of a said indicator to a respective tap point on said resistor, the respective tap points of said operating conductors being spaced at predetermined distance apart with respect to the total resistance of the resistor, whereby as the arms move said brushes along the resistor polyphase varying currents derived from said source will be applied over said conductors to operate said indicators wherein the indication of the respective indicators will differ from each other by a phase difference that is a factor of the location of the corresponding tap points on the resistor, and means whereby the current traversing said indicators will always be in the same direction.

4. In a system of the character described, an endless resistor element, a source of constant electrical potential, a pair of brushes connected to opposite potential terminals of said source, revolvable arms adjustable with respect to one another for carrying said brushes at angular distance apart and in movable conductive contact with said resistor, circuit taps from said resistor at equal angular points around said resistor, a current indicator included in each of said taps, means whereby when the arms are revolved the indicators will each indicate from zero to maximum value and back to zero for each revolution of said arms, and means whereby there will be a phase difference between the indications of the various indicators corresponding to said angular distance.

5. In a system of the character described, an endless resistor element, a source of constant electrical potential, a pair of brushes connected to opposite potential terminals of said source, revolvable arms adjustable with respect to one another for carrying said brushes at angular distance apart and in movable conductive contact with said resistor, circuit taps from said resistor at equal angular points around said resistor, a current indicator included in each of said taps, means whereby when the arms are revolved the indicators will each indicate from zero to maximum value and back to zero for each revolution of said arms, means whereby there will be a phase difference between the indications of the various indicators corresponding to said angular distance, and means whereby the relative time for the respective indicators to move from zero to maximum and back to zero can be predetermined by adjusting the angular position of the arms with respect to each other.

6. In a system of the character described, an endless resistor element, a source of constant electrical potential, a plurality of brushes connected to different potential terminals of said source, constantly movable arms carrying said brushes at predetermined distance apart in movable contact with said resistor, indicators connected in a polyphase circuit system from said resistor, means whereby the respective indicators will indicate the value of the current in corresponding phases of said system, and means including a worm gear for adjusting said distance of the arms with respect to one another so that the rate of increase and decrease change of current value in the phases can be altered without altering the phase relationship or the frequency of the currents in the phases.

7. In a car and dispatching system, a plurality of cars, an indicator for each car, an endless resistance, conductors for connecting the indicators to spaced points on said resistance, a pair of rotatable arms engaging spaced points on said resistance, one of said arms controlling the up speed indication and the other controlling the down speed indication, and means for rotating said arms to cause the indicators to indicate preselected speeds.

8. In a car and dispatching system, a plurality of cars, an indicator for each car, an endless resistance, conductors for connecting the indicators to spaced points on said resistance, a pair of rotatable arms engaging spaced points on said resistance, means including a worm gear for adjusting the relative positions of said arms, one of said arms controlling the up speed indication and the other controlling the down speed indication, and means for rotating said arms to cause the indicators to indicate preselected speeds.

HERBERT M. FRIENDLY.